United States Patent
Lang et al.

(10) Patent No.: US 10,477,775 B2
(45) Date of Patent: Nov. 19, 2019

(54) BALER MASS FLOW SENSING ASSEMBLY AND METHOD

(71) Applicants: Deere & Company, Moline, IL (US); Iowa State University Research Foundation, Inc., Ames, IA (US)

(72) Inventors: Eric R. Lang, Newhall, IA (US); Jeffrey Askey, Boone, IA (US)

(73) Assignees: DEERE & COMPANY, Moline, IL (US); IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 14/855,153

(22) Filed: Sep. 15, 2015

(65) Prior Publication Data
US 2016/0088798 A1    Mar. 31, 2016

Related U.S. Application Data

(60) Provisional application No. 62/057,016, filed on Sep. 29, 2014.

(51) Int. Cl.
| | |
|---|---|
| *A01F 15/08* | (2006.01) |
| *A01D 89/00* | (2006.01) |
| *B30B 9/30* | (2006.01) |

(52) U.S. Cl.
CPC .............. *A01F 15/08* (2013.01); *A01D 89/00* (2013.01); *A01F 15/0825* (2013.01);
(Continued)

(58) Field of Classification Search
CPC ...... A01F 15/10; A01F 15/08; A01F 15/0825; B30B 9/3007; B30B 9/3014; B30B 9/3078; A01D 89/00
See application file for complete search history.

(56) References Cited

U.S. PATENT DOCUMENTS

| | | | |
|---|---|---|---|
| 5,736,652 | A | 4/1998 | Strubbe |
| 5,913,801 | A | 6/1999 | Bottinger et al. |

(Continued)

FOREIGN PATENT DOCUMENTS

| | | | | |
|---|---|---|---|---|
| DE | 10360598 | | 7/2005 | |
| EP | 2962544 | A1 * | 1/2016 | ............. A01D 57/12 |

(Continued)

OTHER PUBLICATIONS

Office Action from the US Patent and Trademark Office for U.S. Appl. No. 14/855,164 dated Feb. 1, 2017 (19 pages).

(Continued)

*Primary Examiner* — Robert E Pezzuto
*Assistant Examiner* — Adam J Behrens
(74) *Attorney, Agent, or Firm* — Michael Best & Friedrich LLP

(57) ABSTRACT

A crop sensing system for a baler includes a compression system for forming a bale and a feed system for picking up crop from a surface and conveying the crop to the compression system. The crop sensing system includes a sensor arrangement having at least one sensor being coupled to at least one of the compression system or the feed system, wherein the at least one sensor generates a signal corresponding to a crop load on the at least one of the compression system or the feed system. The crop sensing system includes a control unit configured to receive the signal from the sensor arrangement and calculate crop mass data based on at least the signal.

8 Claims, 5 Drawing Sheets

(52) U.S. Cl.
CPC ............ B30B 9/301 (2013.01); B30B 9/3007 (2013.01); B30B 9/3078 (2013.01)

(56) References Cited

U.S. PATENT DOCUMENTS

| | | | |
|---|---|---|---|
| 6,112,507 A * | 9/2000 | Mesmer | A01F 15/0825 100/88 |
| 6,474,228 B1 * | 11/2002 | Leupe | A01F 15/04 100/100 |
| 6,546,705 B2 * | 4/2003 | Scarlett | A01F 15/08 56/10.2 R |
| 7,096,653 B2 | 8/2006 | Shinners et al. | |
| 7,104,191 B1 | 9/2006 | Parker et al. | |
| 7,287,365 B2 * | 10/2007 | Dubois | A01F 15/101 100/88 |
| 7,331,168 B2 | 2/2008 | Dubois | |
| 7,404,355 B2 | 7/2008 | Viaud et al. | |
| 8,113,110 B2 | 2/2012 | Kraus | |
| 8,291,818 B2 * | 10/2012 | Matousek | A01F 15/0825 100/142 |
| 8,468,937 B2 | 6/2013 | Matousek et al. | |
| 8,770,102 B2 | 7/2014 | Verhaeghe et al. | |
| 8,924,091 B2 * | 12/2014 | Seeger | A01F 15/0825 100/237 |
| 9,010,240 B2 * | 4/2015 | Missotten | A01F 15/0825 100/188 R |
| 9,010,241 B2 * | 4/2015 | Naaktgeboren | A01F 15/101 100/142 |
| 9,101,092 B2 * | 8/2015 | Verhaeghe | A01F 15/0825 |
| 2007/0245704 A1 * | 10/2007 | Kraus | A01F 15/08 56/10.2 R |
| 2011/0191001 A1 | 8/2011 | Viaud et al. | |
| 2012/0179338 A1 * | 7/2012 | Dresher | A01F 15/101 701/50 |
| 2012/0186465 A1 * | 7/2012 | Dresher | A01F 15/101 100/35 |
| 2012/0186466 A1 * | 7/2012 | Vande Ryse | A01F 15/0825 100/43 |
| 2012/0266764 A1 | 10/2012 | Matousek et al. | |
| 2014/0366752 A1 * | 12/2014 | Naeyaert | A01F 15/101 100/189 |
| 2015/0373911 A1 * | 12/2015 | Weyne | A01D 57/12 56/341 |
| 2015/0373919 A1 | 12/2015 | Verhaeghe et al. | |
| 2016/0014965 A1 * | 1/2016 | Naeyaert | A01F 15/10 56/432 |

FOREIGN PATENT DOCUMENTS

| | | |
|---|---|---|
| SU | 1066496 A1 | 1/1984 |
| SU | 1143313 A1 | 2/1985 |
| WO | 2011012487 | 2/2011 |
| WO | 2014147179 | 9/2014 |

OTHER PUBLICATIONS

EP151873759 Extended European Search Report dated Mar. 8, 2016 (6 pages).
EP151873643 Extended European Search Report dated Mar. 8, 2016 (5 pages).
Russian Search Report issued in counterpart application No. 2015141146 dated Jul. 18, 2019. (2 pages).

* cited by examiner

BALER MASS FLOW SENSING ASSEMBLY AND METHOD

RELATED APPLICATIONS

This application claims priority to U.S. Provisional Patent Application No. 62/057,016 filed on Sep. 29, 2014 and is related to U.S. application Ser. No. 14/855,164, filed on the same day herewith, which also claims priority to U.S. Provisional Patent Application No. 62/057,016, the contents of all of which are incorporated by reference herein.

BACKGROUND

The present disclosure relates to a sensing assembly and method for sensing crop flow in a crop baler. More specifically, the present disclosure relates to a sensor and method for determining a value associated with crop mass through the baler.

SUMMARY

In one aspect, the disclosure provides a crop sensing system for a baler. The crop sensing system includes a sensor arrangement having at least one sensor generating a signal corresponding to a force on a portion of the baler, a control unit configured to receive the signal from the sensor arrangement and calculate crop mass data based on at least the signal, and a display device in communication with the control unit, the display device configured to display a representation of the crop mass.

In another aspect, the disclosure provides a crop sensing system for a baler, the system including a processor and a display device. The processor is configured to receive signals from a sensor arrangement coupled to the baler, calculate crop mass data based at least in part on the signals, and communicate, by way of the display device, a representation of the crop mass data.

In yet another aspect, the disclosure provides a crop sensing system for a baler. The crop sensing system includes a compression system for forming a bale, a feed system for picking up crop from a surface and conveying the crop to the compression system, and a sensor arrangement. The sensor arrangement includes at least one sensor generating a signal, the at least one sensor being coupled to at least one of the compression system or the feed system. The signal corresponds to a crop load on the at least one of the compression system or the feed system. The crop sensing system also includes a control unit configured to receive the signal from the sensor arrangement and calculate crop mass based on at least the signal.

In yet another aspect, the disclosure provides a crop sensing system for a baler. The crop sensing system includes a first conveyor including a bale chamber in which a bale is formed and moved, a second conveyor positioned to pick up crop from a surface and convey the crop toward the bale chamber, and at least one sensor. The at least one sensor is coupled to at least one of the first conveyor or the second conveyor and generates a signal which corresponds to a crop load on the at least one of the first conveyor or the second conveyor. The crop sensing system also includes a controller configured to receive the signal from the sensor and calculate crop mass data based on at least the signal.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and implementation of components set forth in the following description or illustrated in the accompanying drawings. The disclosure is capable of supporting other implementations and of being practiced or of being carried out in various ways. Directions such as clockwise and counterclockwise used herein are for illustrative purposes only.

The disclosure relates to a machine, such as a baler 10. In the illustrated implementation, the disclosure relates to a square baler for forming bales 12 of a crop 14, such as hay. In other implementations, the disclosure may relate to other types of balers, such as other extrusion type balers or non-extrusion type balers, round balers, etc. In yet other implementations, the disclosure may relate to other types of machines, e.g., vehicles, tractors, harvesters, other types of agricultural machines, forestry machines, mining machines, construction machines, machines for manufacturing, etc.

Figure 1:
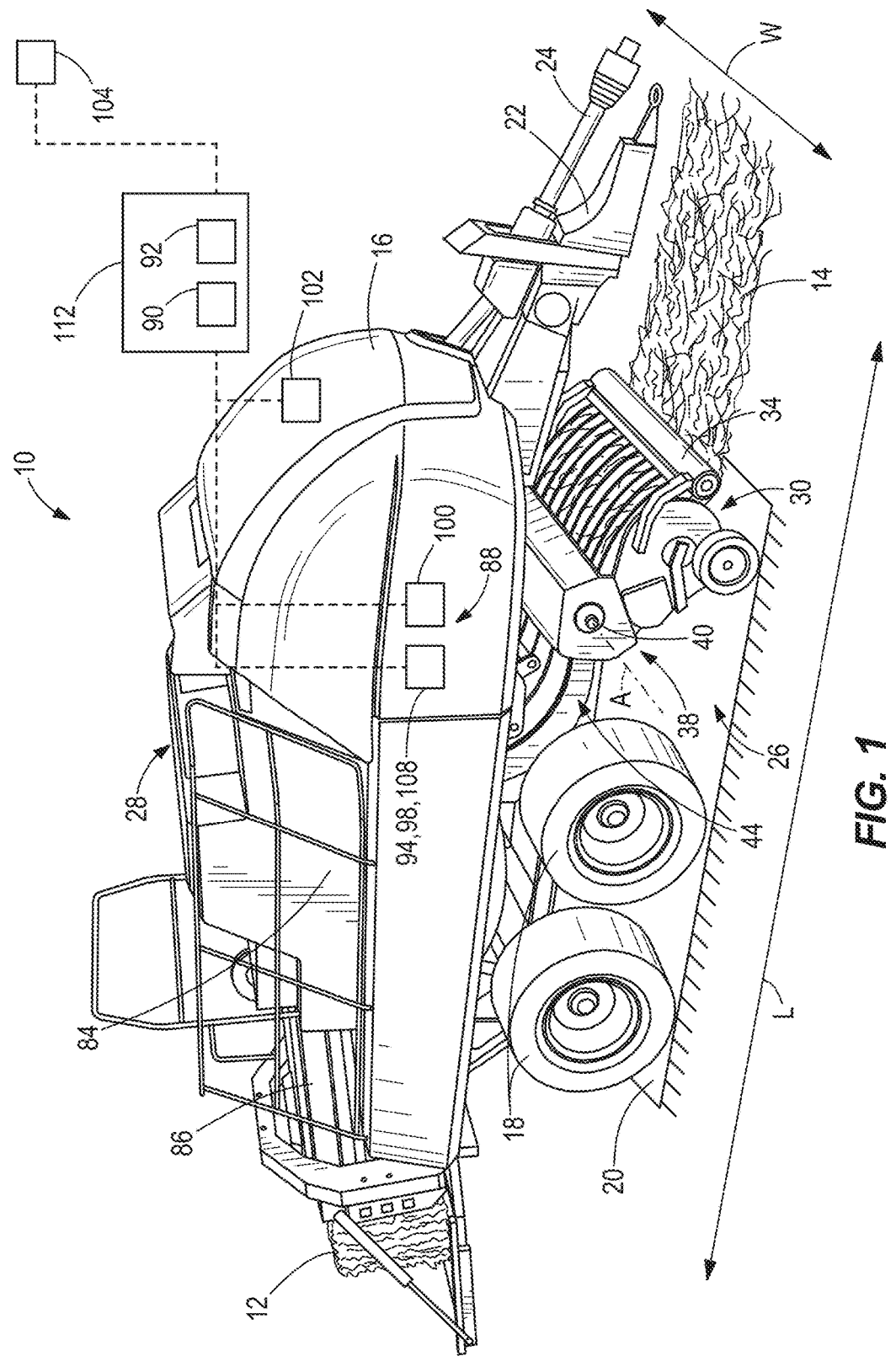
FIG. 1 is a perspective side view of a machine, such as a baler, having a sensor arrangement in accordance with one implementation of the present disclosure.

Referring to FIG. 1, the baler 10 includes a frame 16 supported by wheels 18 for travelling along a support surface 20, such as a field or road. The frame 16 defines a longitudinal direction L generally in the direction of travel of the baler 10 and a width direction W substantially perpendicular to the longitudinal direction L and defined as substantially parallel with the support surface 20. A tow bar 22 is attached to the frame 16, extends generally in the longitudinal direction L, and is connectable to a towing vehicle (not shown), such as an agricultural tractor or other driven vehicle. The baler 10 also includes a power takeoff shaft 24 connectable to the towing vehicle to transmit a rotating drive force from the towing vehicle to various components of the baler 10, such as the components that collect crop 14 and form bales 12, which will be described in greater detail below. In other implementations, the baler 10 may have a dedicated power supply and/or prime mover (not shown), such as an engine, motor, battery, fuel cell, etc., for driving the wheels 18 and for driving and/or powering the various components of the baler 10.

Figure 3:
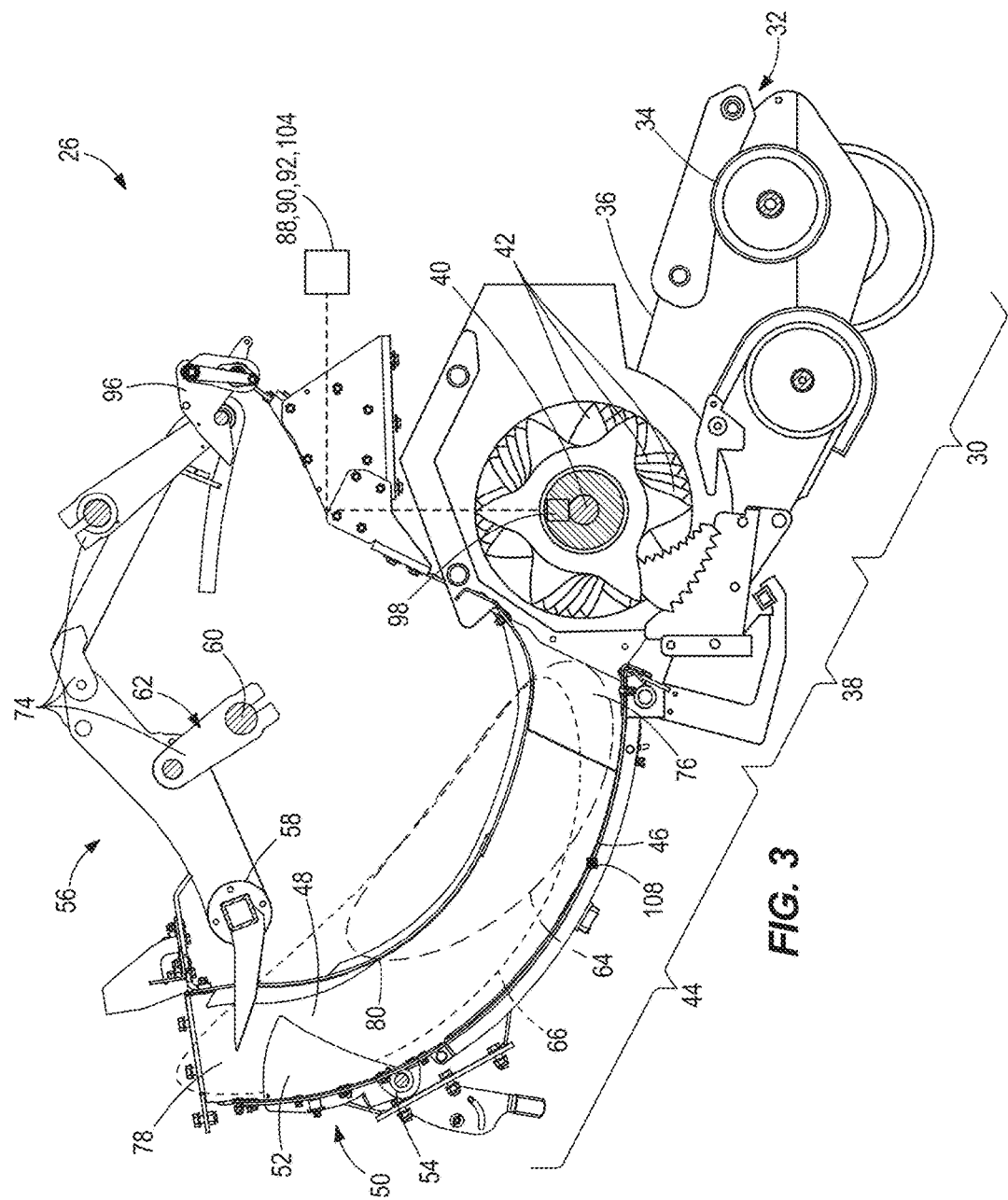
FIG. 3 is a side view of the supply assembly of FIG. 2.

Referring also to FIG. 3, the baler 10 includes a feed system 26 for picking up the crop 14 from the surface and conveying the crop 14 to a compression system 28 (see FIG. 1) to be formed into a bale 12. The compression system 28 compresses the crop 14 (e.g., by way of a plunger or a belt) into a densely packed shape, such as a square or round bale. In the illustrated implementation, the feed system 26 includes a pickup assembly 30 defining an inlet 32 for receiving the crop 14 from the surface. The pickup assembly 30 includes a roller baffle 34 oriented generally in the width direction W for picking up the crop 14 and placing the crop 14 in the baler 10. The pickup assembly 30 includes a pickup plate 36 disposed adjacent the roller baffle 34 for conveying the crop 14 towards a cutter assembly 38. The pickup plate 36 may include a continuous loop surface, e.g., a moving conveyor, driven for conveying the crop 14, or other suitable mechanisms. The cutter assembly 38 includes an elongated cutter shaft 40 oriented generally in the width direction W and carrying a series of cutters or blades 42 for cutting the crop 14. The cutter assembly 38 rotates about a central axis A of the cutter shaft 40, the central axis A being oriented generally in the width direction W substantially parallel to the roller baffle 34. In other implementations, the pickup assembly 30 and cutter assembly 38 may have different constructions and orientations with respect to the baler 10 and with respect to each other.

Figure 2:
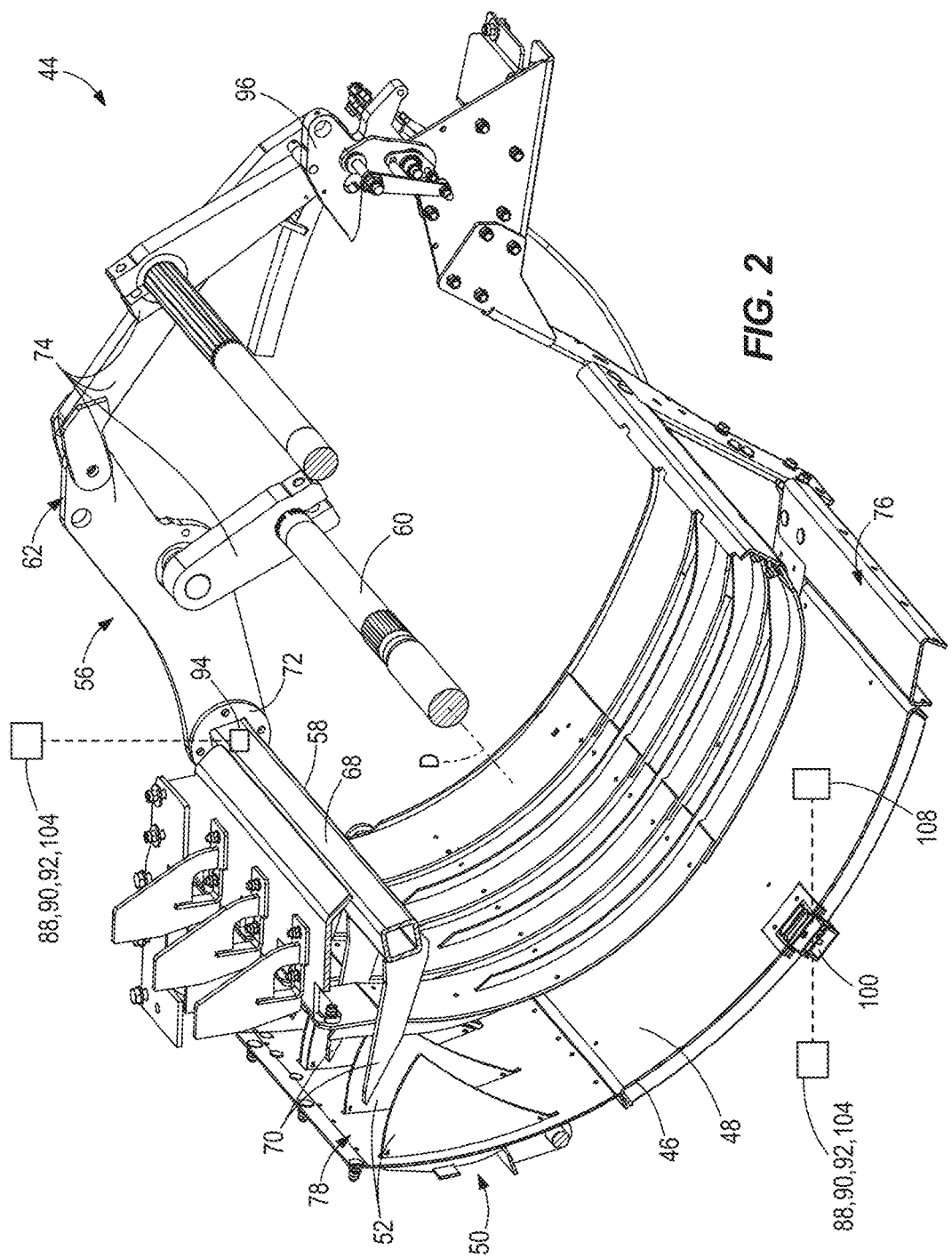
FIG. 2 is an enlarged perspective cross-sectional view of a supply assembly, which is a portion of the machine of FIG. 1.

Referring to FIGS. 2 and 3, the feed system 26 also includes a lifter assembly 44 having a feed pan 46 cooperating with the pickup assembly 30 and the cutter assembly 38 for receiving the crop 14 from the cutter assembly 38. The feed pan 46 defines a pre-compression chamber 48 having a trip mechanism 50 disposed therein. In the illustrated implementation, the feed pan 46 is curved in substantially the shape of an arc; however, in other implementations, the feed pan 46 may have other curved shapes or may be straight. The trip mechanism 50 includes a series of trip plates 52 movably disposed in the pre-compression chamber 48. The trip mechanism 50 deflects from a pack position in which the trip plates 52 are biased by a biasing member 54 to extend into the pre-compression chamber 48 (FIGS. 3-4) to a lift position (not shown) in which the trip plates 52 are pivoted away and at least partially withdrawn from the pre-compression chamber 48. Specifically, the trip plates 52 are deflectable in response to a load of the crop 14, and tend to deflect to the lift position as the load of crop 14 increases in the pre-compression chamber 48. When the load of crop 14 reaches a predetermined crop load, the trip plates 52 are fully deflected into the lift position, which will be described in greater detail below.

Figure 4:
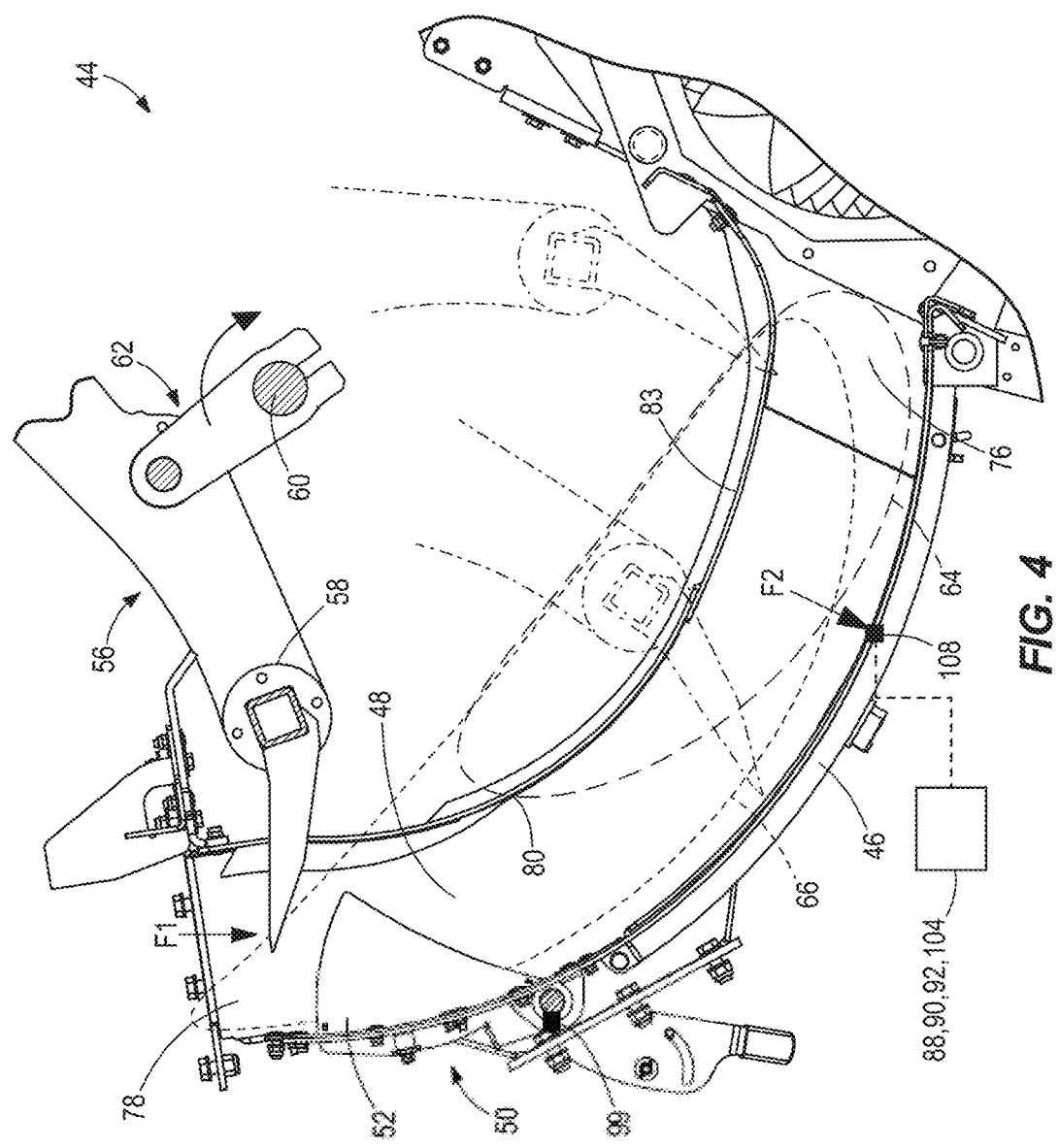
FIG. 4 is an enlarged view of FIG. 3 illustrating the loading fork assembly in various stages of operation.

The lifter assembly 44 also includes a loading fork 56 cooperating with the feed pan 46 and movable through the feed pan 46 within the pre-compression chamber 48 for pre-compressing the crop 14, thereby increasing the crop load in the pre-compression chamber 48. The loading fork 56 includes a fork member 58 coupled to a driving shaft 60 by a loading fork linkage 62. The driving shaft 60 is rotatable about a stationary drive axis D for driving the fork member 58 along a pack path 64 and a lift path 66, as illustrated in FIGS. 2-4. The fork member 58 includes a fork bar 68 having an elongated shape and extending generally in the width direction W. The fork member 58 also includes a plurality of forks 70 extending from the fork bar 68 towards the feed pan 46. In other implementations, the fork member 58 may have other shapes and configurations for sweeping the crop 14. The fork member 58 is rotatably coupled to the loading fork linkage 62 at a fork member joint 72. The loading fork linkage 62 includes a plurality of arms 74, at least one of which is interconnected between the fork member 58 and the driving shaft 60. The trip mechanism 50 may be mechanically or electrically coupled to the loading fork linkage 62 for moving the loading fork linkage 62 between a pack configuration and a lift configuration.

When the trip mechanism 50 is in the pack position, the loading fork linkage 62 assumes the pack configuration in which the fork member 58 is driven through the pack path 64 on a pack stroke. When the trip mechanism 50 is in the lift position, the loading fork linkage 62 assumes the lift configuration in which the fork member 58 is driven through the lift path 66 on a lift stroke. The pack path 64 forms a first continuous loop in which the fork member 58 passes through the feed pan 46 from a receiving end 76 adjacent the cutter assembly 38 towards a supplying end 78 adjacent the compression system 28, exits the feed pan 46 at an intermediate point 80 between the receiving end 76 and the supplying end 78, and returns to the receiving end 76 to begin again. The lift path 66 forms a second continuous loop that can be larger than the first continuous loop (as shown in the illustrated embodiment) in which the fork member 58 passes through the feed pan 46 from the receiving end 76 adjacent the cutter assembly 38 towards the supplying end 78 adjacent the compression system 28. On the lift path 66, the fork member 58 exits the feed pan 46 at an exit point closer to the supplying end 78, and closer to the compression system 28, than the intermediate point 80 in the pack path 64 and then returns to the receiving end 76. In some implementations, the fork member 58 may enter the compression system 28, e.g., a bale chamber to be described below, on the lift stroke. Also in some implementations, the trip plates 52 may be held in the lift position and the fork member 58 may assume the lift path 66 on each stroke.

In the pack path 64, the fork member 58 directs crop 14 from the cutter assembly 38 into the feed pan 46 and compresses the crop 14 in the pre-compression chamber 48. When the crop load reaches a predetermined crop load triggering the trip mechanism 50 to be forced against the bias of the trip plates 52 into the lift position, the trip mechanism 50 switches the loading fork linkage 62 from the pack path 64 to the lift path 66. On the lift stroke, the fork member 58 conveys the crop 14 into the compression system 28. The load of crop conveyed into the compression system 28 on the lift stroke is called a flake.

In other implementations, the feed system 26 may include other structures and configurations, such as those known in other types of balers, such as round balers.

The compression system 28 includes a plunger (not shown) for compressing the crop 14, a bale chamber 84 for receiving and shaping the compressed crop 14, and a bale case or extruder 86 for compressing and dispensing/extruding the compressed crop 14 in the form of a bale 12. The bale chamber 84 is disposed adjacent the supplying end 78 of the feed pan 46 for receiving a load of crop, i.e., the flake, from the pre-compression chamber 48. Generally, in the pack path 64, the fork member 58 packs crop in the pre-compression chamber 48 and, in the lift path 66, the fork member 58 lifts crop from the pre-compression chamber 48 and stuffs the crop into the bale chamber 84. The plunger (not shown) is configured for reciprocating motion in the bale chamber 84 to compact and compress the crop 14 in the bale chamber 84 on each lift stroke. In the illustrated implementation, the bale chamber 84 has a rectangular cross-section for forming square or rectangular bales; however, in other implementations the bale chamber 84 may have other cross sections and configurations. As the bale 12 forms, the bale 12 is packed from the bale chamber 84 into the bale case 86 from which the bale 12 is extruded. Between the bale chamber 84 and the bale case 86, a knotter assembly (not shown) dispenses, wraps, cuts, and ties loops of twine around the bale 12 in response to a bale length sensor (not shown), such as a star wheel, when a predetermined bale length is reached.

In other implementations, the compression system 28 may include other structures and configurations, such as those known in other types of balers, such as round balers.

The baler 10 includes a sensor arrangement 88 having one or more sensors of the same or differing types. The sensor arrangement 88 is electrically coupled to a control unit 112 having a memory storage device 90 and a data manipulation device 92. The sensor arrangement 88 transmits data in the form of an electronic signal or signals to the control unit 112, which in turn transmits a signal or signals to a display device 104. More specifically, the control unit 112 includes input and output circuits, a programmed microprocessor (e.g., the data manipulation device 92) and memory (e.g., the memory storage device 90). The display device 104 may include a screen, such as a liquid crystal display (LCD), a light emitting diode (LED) display, a cathode ray tube (CRT) display, a nanotube display, an audio display including a speaker, or the like.

In one implementation, the sensor arrangement 88 includes a sensor 94 associated with the loading fork 56 for detecting a crop load or force F1 (FIG. 4) applied to the fork member 58 and generating data in the form of a signal or value representative of the force, strain, or torque on, or the deflection of, a component of the loading fork 56. For example, the sensor 94 may include a strain gage applied to a component of the loading fork 56, such as the fork bar 68 (as illustrated in FIG. 2), the loading fork linkage 62, the driving shaft 60, a portion of the loading fork linkage 62 or arm adjacent the fork bar 68, a portion of the loading fork linkage 62 or arm adjacent the driving shaft 60, a catch hook 96, any combination of these locations, or other locations indicative of load (e.g., force, torque) applied to the fork member 58.

Additionally or alternatively, the sensor 94 may be coupled to a component of the compression system 28, such as the plunger (not shown), the bale case 86, a belt (e.g., in round baler constructions), a wall, etc., to monitor the loading (the crop load or force) during the compression stroke.

Additionally or alternatively, the sensor 94 may be positioned to monitor the loading on the power take off shaft 24 to detect the crop load or force, or in those implementations with a dedicated power supply or prime mover, the loading (e.g., force, torque, load current, etc.) associated therewith.

The sensor arrangement 88 may, additionally or alternatively, include a sensor 98 associated with the cutter assembly 38 for detecting crop load or force on the cutter assembly 38 and generating a signal or value representative of the crop load or force on the cutter assembly 38.

Furthermore, the sensor arrangement 88 may, additionally or alternatively, include a sensor 99 (see FIG. 4) associated with the trip mechanism 50, e.g., a strain gage coupled to the biasing member 54 for generating a signal or value representative of the crop load or force.

Furthermore, the sensor arrangement 88 may, additionally or alternatively, include a sensor 108 associated with the feed pan 46, or other component defining the pre-compression chamber 48, for detecting crop load or contact force F2 impinging on one or more of the components defining the pre-compression chamber 48, e.g., a normal force. For example, the sensor 108 may also be disposed on the side walls (not shown) defining and enclosing the pre-compression chamber 48 from the sides and/or on the strippers 83 defining and enclosing the pre-compression chamber 48 from the top. The sensor 108 may also be coupled to the mechanical trip mechanism 50. Specifically, the sensor 108 generates data in the form of a signal or value representative of the crop load or contact force F2 impinging on the component defining the pre-compression chamber 48. For example, the sensor 108 may include a contact pressure sensor, such as a load cell, a strain gage, a movably mounted load plate, etc., coupled to the feed pan 46 bottom, sides, top or other component defining the pre-compression chamber 48. The sensor 108 may also be coupled to the trip plates 52 (e.g., to the biasing member 54 or other component of the trip mechanism 50) to measure the contact force F2 on the feed pan 46. The sensor 108 may also include a movably mounted device similar to the trip plates 52 to measure the contact force F2 by measurement of deflection of the movably mounted device.

In other implementations, the sensor arrangement 88 may additionally or alternatively include other types of sensors for sensing the crop load or force, such as a contact pressure sensor, for example a contact pressure plate, for detecting the impact of crop 14 on a surface. The sensor arrangement 88 may include one or more contact pressure sensors coupled to various components of the feed system 26, such as the forks 70, e.g., to one or more of the forks 70, one or more of the trip plates 52, the feed pan 46, the roller baffle 34, the pickup plate 36, or other components in direct or indirect contact with the crop 14. The contact pressure sensor may be configured to directly or indirectly measure the force of the crop 14 impinging on one or more components of the baler 10.

In yet other implementations, the sensor arrangement 88 also includes a moisture sensor 100 for sensing moisture or humidity and generating a moisture signal indicative of the moisture or humidity of the crop 14 or the air within any part of the baler 10. The moisture sensor 100 may be disposed in communication with the feed pan 46, e.g., in or adjacent the pre-compression chamber 48, as shown in FIG. 2. In other implementations, the moisture sensor 100 may be located in other locations where the crop 14 can be found, such as the pickup assembly 30, the cutter assembly 38, the fork member 58, the bale chamber 84, the bale case 86, etc.

In some other implementations, the sensor arrangement 88 may additionally or alternatively include other types of sensors for sensing other parameters and conditions, for example, temperature. In yet other implementations, other types of sensors (e.g., electronic, mechanical, optical, piezoelectric, Hall effect, magnetic, electromagnetic, etc.) may be employed.

The sensor arrangement 88 may include any combination of one or more of any of the sensors discussed herein.

With reference to FIG. 1, sensor arrangement 88 also includes a global positioning system (GPS) 102. The GPS 102 is in communication with the memory storage device 90 for collecting and storing, respectively, data reflecting the location of the towing vehicle and/or baler 10 over a period of time and in conjunction with the other data such that a time and location may be attributed to each data point. The memory storage device 90 may be located on board the towing vehicle or the baler 10. Alternatively, in other implementations, the memory storage device 90 may be remote from the towing vehicle or baler 10, and the data may be transmitted wirelessly to the memory storage device 90. The sensor arrangement 88 additionally may also take other measurements such as time, displacement, and distance that are useful for other calculations, such as distance traveled, time, bale time, mean velocity, location of bale creation and bale completion, bale creation duration, bale driven distance, flakes per bale, strokes per bale, stroke to flake ratio, bale length left, bale length right, fork load, crop moisture, etc., which is collected and stored in the memory storage device 90. The data may be manipulated by the data manipulation device 92, and the data and/or the manipulated data may be displayed on the display device 104 in real time and/or after the data is collected. For example, the data may be stored and thereafter downloadable for processing after the baling operation. The display device 104 may be disposed in or on the towing vehicle and/or the baler 10, and may also include one or more auxiliary display devices 104 used after the data is transferred to other devices.

In operation, the roller baffle 34, the cutter shaft 40, the driving shaft 60 of the loading fork 56, the plunger, etc., are driven or powered ultimately by the tractor vehicle by way of the power takeoff shaft 24, or by the dedicated power supply or prime mover in other implementations. The pickup assembly 30 receives crop 14 from the surface and conveys the crop 14 to the cutter assembly 38, which cuts the crop 14 and feeds the crop 14 to the lifter assembly 44. The lifter assembly 44 compresses the crop 14 into the pre-compression chamber 48 and then lifts and conveys the crop 14, now the flake, into the bale chamber 84, thereby conveying the crop 14 to the compression system 28. The plunger of the compression system 28 compresses the flake into the forming bale in the bale chamber 84. When the bale length sensor determines that the bale 12 has reached the predetermined length, the knotters tie twine around the bale 12 and the bale 12 is extruded through the bale case 86 as the next bale is formed behind it.

The sensors 94, 98, 99, 108 measure the instantaneous load applied to the loading fork 56, and/or the cutter assembly 38, and/or the pre-compression chamber 48, and/or the compression system 28 by the crop 14, and are therefore indicative of the mass of the crop 14. Both mass estimates and weight estimates are encompassed by the term "mass" herein and in the appended claims. The data are manipulated using the data manipulation device 92 to determine a value corresponding with crop mass through the baler 10, e.g., mass flow through the feed pan 46, and/or mass flow through the cutter assembly 38, and/or mass flow through the pickup assembly 30, and/or mass flow through the compression system 28.

For example, the crop load F1 on the fork member 58 during a portion or all of the lift stroke can be integrated, summed, or otherwise manipulated by the data manipulation device 92 over at least a portion of the course of the sweep (i.e., a portion of the lift path 66 in which the forks 70 are disposed substantially within the feed pan 46 on an upstroke for lifting the crop 14 from the receiving end 76 to the supplying end 78 and into the bale chamber 84) to output a value or output that corresponds with bale flake mass and, in turn, bale weight. Time may also be recorded and a corresponding time coupled with each mass data point, which in turn may be processed by the data manipulation device 92 to calculate mass flow rate. Geospatial location, such as GPS location, may also be recorded and a corresponding location coupled with each mass data point. Time and GPS location may be manipulated to determine speed data corresponding with the mass data. In other implementations, the crop load F1 on the fork member 58 during all or a portion of the pack stroke may be integrated, summed, or otherwise manipulated to output a value that corresponds with crop mass, or a combination of crop load data on the fork member 58 during the lift stroke and/or the pack stroke may be integrated or otherwise manipulated to achieve the same.

The contact force F2 may additionally or alternatively be processed by the data manipulation device 92 to calculate and/or refine the mass data. In some implementations, signals from the sensor 94 and the sensor 108 are used together to generate the mass data; however, other signals from any single sensor or any combination of sensors in the sensor arrangement 88 may be used to generate the mass data.

The moisture sensor 100 data may additionally be processed in the data manipulation device 92 to further refine the mass output, accounting for variations attributable to moisture or humidity of the crop 14 or the air. For example, excess moisture may cause sticking of the crop 14, which may influence the force F1 on the fork member 58. Furthermore, wet crop has a portion of its mass attributed to water. By taking moisture levels of the crop 14 into account in the data manipulation device 92, the data may be manipulated to achieve a more accurate calculation of mass of the crop 14 as a dry crop.

Furthermore, multiple load sensors may work to provide multiple load signals to the data manipulation device 92. The multiple load sensors could work redundantly, or as checks on each other, etc., to increase accuracy and reliability of the mass output, and alone or in combination with the moisture sensor 100, the GPS 102, time, temperature, etc. Likewise, multiple sensors of other types, such as the types described above, may similarly be applied in any combination to the data manipulation device 92 to increase accuracy of the output.

As such, various sensors of the sensor arrangement 88 may be employed to collect the data that may be used to determine or approximate the output corresponding with crop mass flow through the baler 10. Mass flow data is useful to the user live in real time for monitoring local variances in crop yield, making route decisions, or other geospatial considerations, and may also be useful after baling to estimate efficiency, yield, bale mass (average, mean, median), bale weight (average, mean, median), route considerations, etc. Machine performance and capacity can be analyzed based on instantaneous mass flow data.

Figure 5:
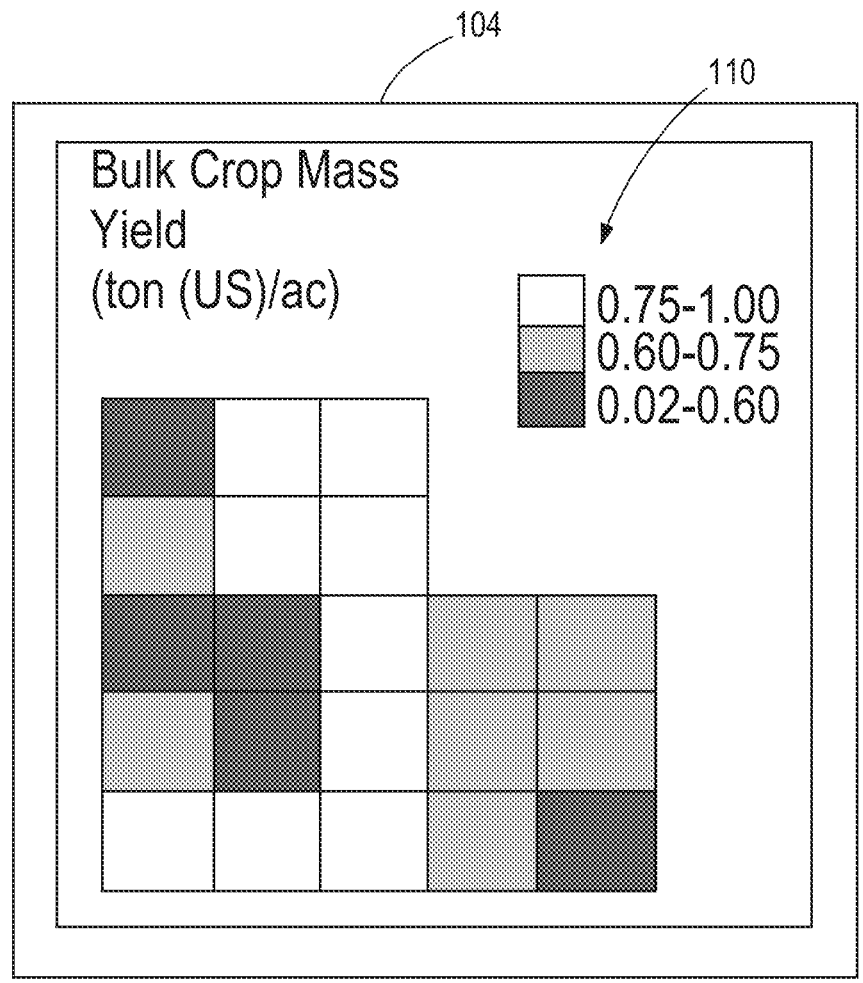
FIG. 5 is a schematic illustration of a display device mapping data collected by the machine of FIGS. 1-4.

A representation 110 of the mass data, e.g., the output, may be displayed on the display device 104 live in real time and/or recorded for future display after the baling operation is completed. The display device 104 may map the mass data based on time, speed, location, moisture, etc. For example, FIG. 5 illustrates the display device 104 having the representation 110 in the form of a yield map displayed thereon. The yield map provides a geospatial representation of a field and includes indicia, such as color, shades of grey, symbols, etc., representing crop yield throughout the geospatial field. For example, the geospatial representation of the field includes an aerial map of the field divided into sections (e.g., by way of a grid or other representation) representing geographical locations, such as by acre. Each section of the field includes the indicia representative of the crop yield (e.g., in tons or any other suitable unit per acre or other suitable unit) at that location. Other representations such as displaying numbers, raw data, plots, graphs, charts, maps, etc. may also be employed.

Thus, the disclosure provides, among other things, a sensing apparatus and method for determining a value associated with mass flow of crop through a baler or other equipment. While the above describes example embodiments of the present disclosure, these descriptions should not be viewed in a limiting sense. Rather, there are several variations and modifications which may be made without departing from the scope of the present disclosure.

What is claimed is:

1. A crop sensing system for a baler comprising:
   a compression system for forming a bale;
   a feed system for picking up crop from a surface and conveying the crop to the compression system;
   a sensor arrangement including at least one sensor being coupled to at least one of the compression system or the feed system, the at least one sensor configured to generate signals over a duration of time which correspond to a series of instantaneous crop loads on the at least one of the compression system or the feed system; and a control unit configured to receive the signals from the sensor arrangement over the duration of time and calculate crop mass flow rate based on at least the signals and the duration of time recorded in conjunction with the signals, wherein the baler includes a loading fork having a range of motion for passing crop from a pre-compression chamber into the compression system, wherein the at least one sensor is a first sensor coupled to the loading fork, wherein the signals are first signals from the first sensor, wherein the sensor arrangement includes a second sensor coupled to the pre-compression chamber and configured to generate a second signal, and wherein the control unit is configured to calculate the crop mass flow rate based on at least 1) the first signals from the first sensor corresponding to crop loads on the loading fork and the duration of time recorded in conjunction with the first signals and 2) the second signal from the second sensor corresponding to the crop load on the pre-compression chamber.

2. The crop sensing system of claim 1, wherein the pre-compression chamber includes a feed pan at least partially defining the pre-compression chamber, and wherein the second sensor is coupled to the feed pan for measuring a crop load generally normal to the feed pan.

3. The crop sensing system of claim 2, wherein the control unit calculates the crop mass flow rate at least in part by integrating the first signal from the first sensor over at least a portion of the range of motion of the loading fork over the duration of time recorded in conjunction with the first signal and based on the crop load on and generally normal to the feed pan.

4. The crop sensing system of claim 1, wherein the control unit calculates the crop mass flow rate at least in part by integrating the first signal from the first sensor over at least a portion of the range of motion of the loading fork over the duration of time recorded in conjunction with the first signal.

5. The crop sensing system of claim 1 further comprising:
a display device; and
a global positioning system in communication with the control unit and configured to generate location data, wherein the control unit pairs the location data with corresponding crop mass data in real time, wherein the display device displays a geospatial representation of the location and crop mass data.

6. A crop sensing system for a baler comprising:
a first conveyor including a bale chamber in which a bale is formed and moved;
a second conveyor positioned to pick up crop from a surface and convey the crop toward the bale chamber;
at least one sensor coupled to at least one of the first conveyor or the second conveyor, and configured to generate signals over a duration of time which correspond to a series of instantaneous crop loads on the at least one of the first conveyor or the second conveyor; and
a controller configured to receive the signals from the sensor over the duration of time and calculate crop mass flow rate based on at least the signals and the duration of time recorded in conjunction with the signals,
wherein the second conveyor includes a loading fork having a range of motion for passing crop from a pre-compression chamber into the bale chamber, wherein the at least one sensor is a first sensor coupled to the loading fork, wherein the signals are first signals from the first sensor, further comprising a second sensor coupled to the pre-compression chamber and configured to generate a second signal, wherein the controller is configured to calculate the crop mass flow rate based on at least 1) the first signals from the first sensor corresponding to the crop load on the loading fork and the duration of time recorded in conjunction with the first signals and 2) the second signal from the second sensor corresponding to the crop load on the pre-compression chamber.

7. The crop sensing system of claim 6, wherein the controller calculates the crop mass flow rate at least in part by integrating the first signals from the first sensor over at least a portion of the range of motion of the loading fork over the duration of time recorded in conjunction with the first signals.

8. The crop sensing system of claim 6, wherein the controller is configured to calculate a crop mass at least in part by integrating or summing the signals from the sensor over at least a portion of the range of motion of the loading fork, and wherein the controller is configured to calculate crop mass flow rate based at least in part on the calculated crop mass.

* * * * *